United States Patent
Kroepke et al.

(10) Patent No.: US 7,849,673 B2
(45) Date of Patent: Dec. 14, 2010

(54) PROCEDURE FOR HEATING-UP AND KEEPING WARM AN EMISSION CONTROL ASSEMBLY OF A MOTOR VEHICLE

(75) Inventors: Karsten Kroepke, Ludwigsburg (DE); Juergen Pantring, Schwieberdingen (DE); Kersten Wehmeier, Ludwigsburg (DE); Jens Wolber, Gerlingen (DE); Ruediger Weiss, Moetzingen (DE); Detlef Heinrich, Ludwigsburg (DE); Martin Streib, Vaihingen (DE); Karl-Bernhard Lederle, Renningen (DE); Helmut Zell, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 774 days.

(21) Appl. No.: 11/731,270

(22) Filed: Mar. 30, 2007

(65) Prior Publication Data

US 2007/0261388 A1 Nov. 15, 2007

(30) Foreign Application Priority Data

May 12, 2006 (DE) .................. 10 2006 022 384

(51) Int. Cl.
*F01N 3/00* (2006.01)
(52) U.S. Cl. .................. 60/284; 60/274; 60/280; 60/285; 60/286; 180/65.21; 180/65.28
(58) Field of Classification Search ............. 60/274, 60/280, 284, 285, 286; 180/65.2, 65.3, 65.4, 180/65.21, 65.28, 65.31, 309
See application file for complete search history.

(56) References Cited

U.S. PATENT DOCUMENTS

| | | | |
|---|---|---|---|
| 5,916,130 A * | 6/1999 | Nakae et al. ................. | 60/276 |
| 6,868,926 B2 * | 3/2005 | Boggs et al. ............ | 180/65.235 |
| 7,013,637 B2 * | 3/2006 | Yoshida ....................... | 60/285 |
| 7,152,395 B2 * | 12/2006 | Inoue et al. .................. | 60/286 |
| 7,404,289 B2 * | 7/2008 | Miwa et al. .................. | 60/285 |
| 7,597,164 B2 * | 10/2009 | Severinsky et al. ........ | 180/65.27 |

FOREIGN PATENT DOCUMENTS

DE  44 00 260 A1  7/1995
DE  101 60 018 A1  6/2003

* cited by examiner

*Primary Examiner*—Binh Q Tran
(74) *Attorney, Agent, or Firm*—Merchant & Gould P.C.

(57) ABSTRACT

The invention relates to a procedure to heat up or keep warm an exhaust gas emission control assembly of a vehicle with a drive train containing one transmission. The drive train is powered by an internal combustion engine and at least one second drive unit. It is proposed that also in an operating state, which lies outside of the idle speed, a rotational speed or a torque of the internal combustion engine deviating from values for the engine rotational speed and the torque is set, which would exist during an identical driving condition without the heating-up or keeping warm of the exhaust gas emission control assembly.

14 Claims, 1 Drawing Sheet

Figure 1:
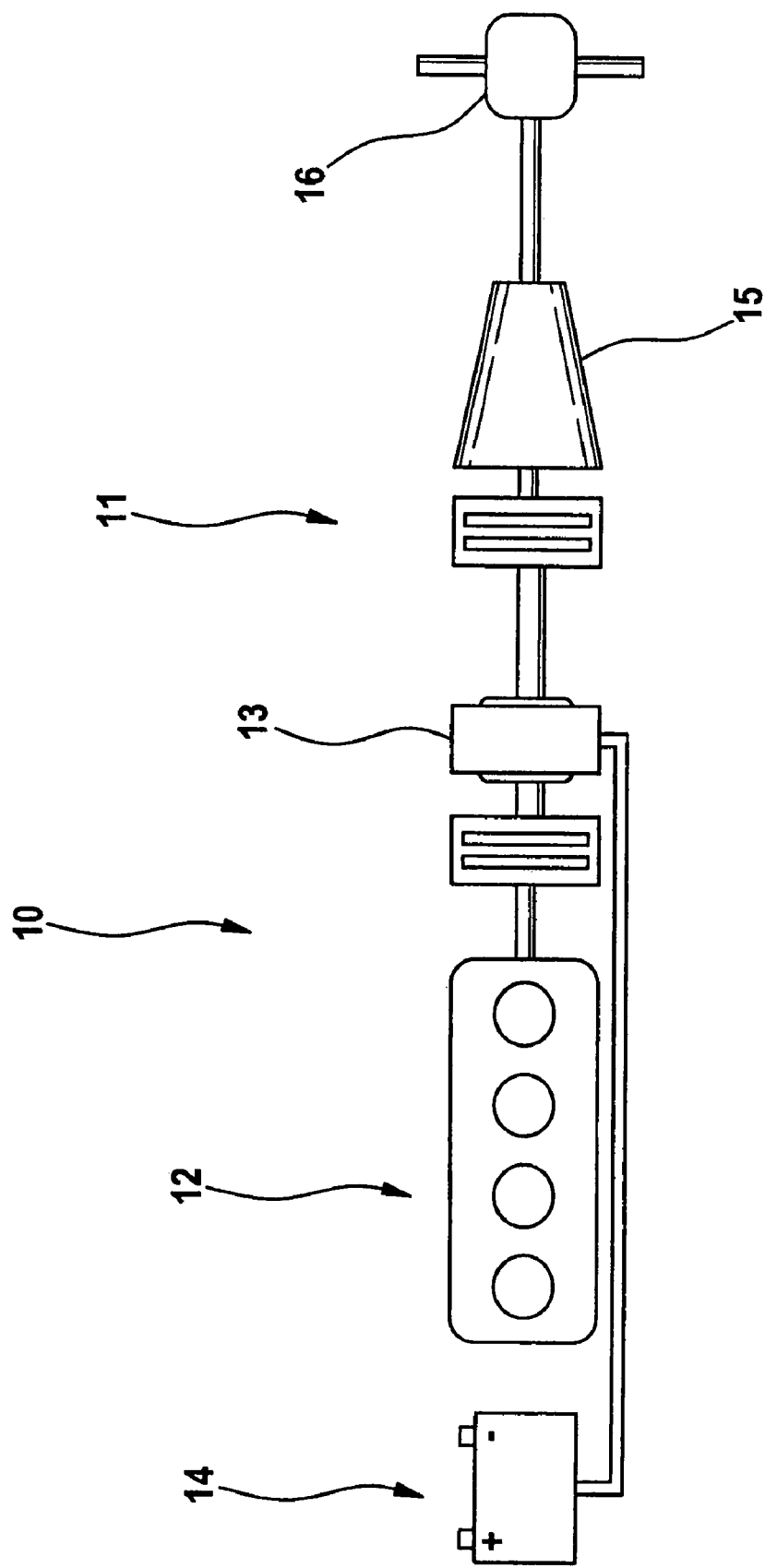

PROCEDURE FOR HEATING-UP AND KEEPING WARM AN EMISSION CONTROL ASSEMBLY OF A MOTOR VEHICLE

The invention proceeds from a procedure to heat up or keep warm an emission control assembly of a motor vehicle according to the preamble of the claim 1 and proceeds from a motor vehicle according to the preamble of the claim 15.

A procedure to quickly heat up an emission control system with a catalytic converter in a motor vehicle with an internal combustion engine is known from the German patent DE 44 00 260 A1. In this connection an internal combustion engine is supplied unrestricted with air and in fact independent of whether an accelerator pedal is used or not. The engine rotational speed and the torque of the internal combustion engine are adjusted entirely by the advance angle and in fact in such a way that a performance of the internal combustion engine occurs as is the case with conventional engine timing. Consequently, a certain rotational speed is set at idle speed, which can change according to a specified progression; whereas when the accelerator pedal is activated, a torque corresponding to the position of the accelerator pedal is set. The quick heating-up is implemented by means of a targeted intervention into the advance angle; so that during a high flow of incoming air, the engine does not exceed a warming-up rotational speed.

From the German patent DE 101 60 018 A1, a hybrid-electric drive train with an internal combustion engine and an electric machine is known, in which an optimal engine rotational speed is specified as a function of a current power demand on the drive train and as a function of the current available output capacity of the drive train by means of a coordinated activation of the internal combustion engine and the electric machine while maintaining the current power demand.

DISCLOSURE OF THE INVENTION

In a procedure according to the invention for a motor vehicle of the kind mentioned at the beginning of the application, it is proposed that also in an operating state, which lies outside of an idle speed, a rotational speed or a torque of an internal combustion engine deviating from the values of the engine rotational speed or the torque is set, which would exist during an identical driving operational state without the heating-up or keeping warm of the exhaust gas emission control assembly.

In so doing, the exhaust gas emission control assembly with at least one catalytic converter is quickly heated up. The internal combustion engine driving one drive train works in such a way that the exhaust gas produced by the internal combustion engine gives off an optimal waste heat to heat up or keep the catalytic converter warm. In so doing, the catalytic converter is quickly brought into an operating state, in which it converts, i.e. optimally controls the exhaust gas emissions. The internal combustion engine works in an operating state optimized to the exhaust gas, in which a low emission of exhaust gases is attained. For this end the internal combustion engine is operated with an increased rotational speed, a retarded advance angle and with as low a load as possible. The advantage resulting from this is that the internal combustion engine can be intransigently so operated, so that an optimal low emission of exhaust gases is attained.

In a first embodiment of the procedure, the internal combustion engine is disengaged from the drive train and a rotational speed or a torque is supplied to the transmission from the second drive unit.

In the warm-up phase of the catalytic converter, i.e. if the catalytic converter has not yet achieved its optimal operating temperature, the internal combustion engine is disengaged as far as possible from the driver's input. The driver's input is implemented by means of the second drive unit disposed in the drive train, which transfers the output, which the driver of the motor vehicle demands by operating the accelerator pedal, i.e. accelerating, to the transmission. Due to a corresponding control of the second drive unit, the driver of the motor vehicle does not notice that the output is not produced by the internal combustion engine. An advantage that can be made use of in this case is for the motor vehicle to have two drive units. It has more degrees of freedom than one with only one drive unit.

The disengagement of the internal combustion engine from the drive train results from dependence on ambient conditions and/or dependence on the already implemented heating-up process of the exhaust gas emission control assembly, especially from a heating progression of the exhaust gas emission control assembly. In so doing, the second drive unit is only then powered up if the catalytic converter is not yet at the optimal operating temperature, for example when cold starting.

In an additional advantageous embodiment of the procedure, an optimum engine rotational speed required for heating-up or keeping the exhaust gas emission control assembly warm, or an optimum torque required for heating-up and keeping the assembly warm is calculated.

In an advantageous embodiment a minimum engine rotational speed or a minimum torque, which in each case represents a lower threshold value for the heating-up of the exhaust gas emission control assembly, is calculated.

In an advantageous embodiment a maximum engine rotational speed or a maximum torque, which in each case represents an upper threshold for the heating-up of the exhaust gas emission control assembly, is calculated.

The calculated values for the engine rotational speed or the torque can be used in a motor vehicle control system, in order, for example, to disengage the internal combustion engine from the drive train or to reengage it again with the transmission. Additionally the calculated values can be compared with the measured data ascertained during the operating phase of the motor vehicle, and corresponding open loop controls are implemented. In this instance the optimum engine rotational speed and the optimum torque correspond in each case to the optimal value for a quick and optimized heating-up of the exhaust gas emission control assembly.

In an advantageous embodiment of the procedure, the optimum engine rotational speed and/or the minimum engine rotational speed and/or the maximum engine rotational speed are assigned a priority or priorities.

The assignment of a priority is understood in such a way that the calculated values for the optimum engine rotational speed, the minimum engine rotational speed and the maximum engine rotational speed are hierarchically, i.e. sequentially, arranged. The engine rotational speed with the highest priority, for example the optimum engine rotational speed, is always used first for purposes of comparison and is compared with a value to be compared, for example a measured value. If the value to be compared is an acceptable engine rotational speed; it will be set. If on the other hand it is not an acceptable value, the engine rotational speed with the subsequently lower priority is used as a comparison value and so on.

In an advantageous embodiment of the procedure, the optimum torque and/or the minimum torque and/or the maximum torque are assigned a priority or priorities.

In so doing, the calculated torques are hierarchically arranged, in that a priority is assigned to each of the torques.

In an advantageous embodiment of the procedure, demands from varying functional units different from the exhaust gas emission control assembly in a motor vehicle control system with regard to the engine rotational speed are allowed, whereby in each case a priority is assigned to the demands of the varying functional units.

In so doing, functional units important to and less important to the operation of the motor vehicle can be treated differently in the motor vehicle control system.

In an advantageous embodiment of the procedure, the demands, which do not themselves originate from the heating-up or keeping warm of the exhaust gas emission control assembly, are only then taken into account, if their priority is higher or the engine rotational speed demanded lies above the minimum rotational speed and/or beneath the maximum rotational speed.

In an advantageous embodiment of the procedure the demands, which do not themselves originate from the heating-up and keeping warm of the exhaust gas emission control assembly, are only then taken into account if their priority is higher, or the torque demanded lies above the minimum torque and/or beneath the maximum torque.

The demands with regard to the torque or the engine rotational speed are assigned a very high priority during the warm-up phase of the catalytic converter. These can only be annulled by a function with an established higher priority. This would be, for example, the case, if the second drive unit would fail and a driving operation would be no longer possible.

In an advantageous embodiment of the procedure, the engine rotational speed is set, in that an open loop control of an automatic transmission adjusts the selection of its gear ratio in such a manner that a rotational speed lying as close as possible to the optimum engine rotational speed results or that the rotational speed is at least equal to the minimum engine rotational speed or maximally equal to the maximum engine rotational speed.

In the case of a parallel hybrid vehicle, in which the rotational speeds of the internal combustion engine and the second drive unit cumulatively add up, provision is absolutely made for an automatic transmission; and it is implemented, for example, by means of a continuous variable transmission, CVT, or a double-clutch. A serial hybrid vehicle with a power-split principle always has as a matter of principle the automatic transmission operation. In this case, the internal combustion engine and the second drive unit are designed for the same rotational speed, and the second drive unit is only switched on for spikes.

In an advantageous embodiment of the procedure, the second drive unit is set in such a way that by means of the interaction of the torques of the internal combustion engine and the second drive unit, the torque demanded is set, whereby the internal combustion engine is operated in such a way that the torque emitted by it corresponds to the optimum torque calculated for the heating-up of the exhaust gas emission control assembly or is greater than the minimum torque and/or is smaller than the maximum torque.

In an advantageous embodiment of the procedure, the rotational speeds of both of the drive units in a power-split-system are set in such a way that the rotational speed of the internal combustion engine lies as close as possible to the optimum engine rotational speed or that it does not fall short of the minimum engine rotational speed or does not exceed the maximum engine rotational speed.

In the case of a parallel hybrid vehicle, in which the torques of the internal combustion engine and the second drive unit cumulatively add up, provision is absolutely made for an automatic transmission, and it is implemented, for example, with a continuous variable transmission, CVT, or a double-clutch.

In an advantageous embodiment of the procedure, the optimum engine rotational speed, the minimum engine rotational speed and/or the maximum engine rotational speed or the optimum torque, the minimum torque and/or the maximum torque are variably dependent on the ambient conditions and/or dependent on the already implemented heating-up process of the exhaust gas emission control assembly.

By ambient conditions the outside temperature is, for example, understood. Moreover, in the case that the catalytic converter has the ideal operating temperature, maintenance of the optimal engine rotational speed is no longer necessary, so that the internal combustion engine can also be operated outside of the optimal engine rotational speed.

Provision is made according to the invention in the case of a motor vehicle of the kind mentioned at the beginning of the application for the internal combustion engine depending on a necessary engine rotational speed for the heating-up and keeping warm of the exhaust gas emission control assembly or depending on the torque for the same purposes to be able to be disengaged from the drive train, whereby in an operating state, which lies outside of the idling speed, a rotational speed or a torque of the internal combustion engine can be set, which deviates from the values for the engine rotational speed or the torque. This new engine rotational speed or torque value would be set during an identical driving operational state without the heating-up or keeping warm of the exhaust gas emission control assembly.

In so doing, a quick heating-up of the exhaust gas emission control assembly is implemented in an operating state, which is different from the idling mode of operation.

A demand on the engine rotational speed or the torque in order to achieve a demanded driving performance is provided by the second drive unit, of which there is at least one, to a transmission of the drive train. It is thereby possible to heat up the exhaust gas emission control assembly as quickly as possible and thus bring it to optimal operating temperatures without the driver noticing any sacrifice in the driving performance. The additional degrees of freedom of a motor vehicle with two power drive units, preferably an internal combustion engine and an electromotor, can be deployed so advantageously for the optimization of the emission of exhaust gases. For this purpose, the optimum engine rotational speed, a maximum engine rotational speed and a minimum engine rotational speed as well as the optimum torque, a maximum torque and a minimum torque can be calculated in a calculation unit of a motor vehicle control system.

Provision is made in an embodiment of the motor vehicle for the second drive unit to be an electric machine.

A hybrid motor vehicle has an internal combustion engine and an electric machine, which typically can be operated as an electromotor and as a generator.

In an advantageous embodiment of the motor vehicle, provision is made for the internal combustion engine to be disengaged from the drive train by means of a decoupler.

It is additionally advantageous to design the motor vehicle control system in such a way that provision is made for a calculation unit to calculate an optimum engine rotational speed, an optimum torque, a minimum engine rotational speed, a minimum torque, a maximum engine rotational speed and/or a maximum torque.

Additional forms of embodiment, aspects and advantages of the invention also result independently from their summarization in claims without restriction of the generality of the following description using the only FIGURE of the example of embodiment of the invention depicted in the drawing.

The only FIGURE shows in a sectional representation a schematic depiction of a drive train of a motor vehicle designed as a parallel hybrid.

The motor vehicle 10 comprises a drive train 11, which can be engaged with an internal combustion engine 12 and an electric machine 13, which is connected to a battery 14, and a transmission 15, a decoupler 16, a clutch 17 and a drive 18, preferably a differential drive 18.

An exhaust gas emission control assembly is not depicted in the FIGURE, which comprises at least one catalytic converter, and which must have a certain operating temperature for optimal performance, i.e. for the optimal purification of the exhaust gases fed through the exhaust gas emission control assembly.

The optimal operating temperature is set as quickly as possible, if the internal combustion engine 12 is operated with an optimum engine rotational speed, which is an engine rotational speed optimized for the control of exhaust gases, or with an optimum torque, which is a torque optimized for the control of exhaust gases. When cold starting, if the exhaust gas emission control assembly is still cold, only an insufficient conversion, i.e. an insufficient control of the exhaust gases in the assembly, takes place, so that the emission of the exhaust gasses is high.

In order to quickly heat up or to keep the catalytic converter warm, as much waste heat as possible must be given off to the exhaust gas emission control assembly by way of the exhaust gases. This is attained, in that the internal combustion engine 12 is operated with an optimal rotational speed, which is designated as optimum engine rotational speed, or is operated with an optimal torque, which is designated as optimum torque.

In order to meet the demand of the driving performance requirements, which mean, for example the motor vehicle's speed, a drive unit, preferably the internal combustion engine 12, in a motor vehicle with two drive units is deployed to heat up the exhaust gas emission control assembly; and the other drive unit, preferably the electric machine 13, is deployed to implement the demands of the driver, i.e. the motor vehicle's speed.

Among other things two concepts are known for a hybrid vehicle: the so-called power-split-concept, also known as the power-split hybrid, and the concept of the parallel hybrid. In both concepts it is possible to significantly detach the internal combustion engine 12 from the driver's input and to design a rotational speed of the internal combustion engine 12 quasi uncompromisingly to an optimal emission control. By means of the corresponding open loop control of the electric machine 13, the input of the driver can nevertheless be implemented in a broad scope, so that the driver does not notice any difference in the performance of the vehicle between the heating-up phase and a normal operating mode.

The invention claimed is:

1. A method of heating-up and keeping warm an exhaust gas emission control assembly of a motor vehicle with a drive train, containing one transmission, which is powered by an internal combustion engine and at least one second drive unit, the method comprising: setting at least one of a rotational speed and a torque of the internal combustion engine in an operating state which lies outside of an idling operational state in which the engine operates at an idling speed and wherein the at least one of a rotational speed and a torque of the internal combustion engine in the operating state is deviated from at least one of a standard operating values for rotational speed and torque of the operating state which facilitate operation of the internal combustion engine without performing at least one of heating-up and keeping warm of the exhaust gas emission control assembly, and wherein the method further comprises calculating at least one of an optimum engine rotational speed and an optimum torque required for performing at least one of heating-up and keeping warm of the exhaust gas emission control assembly, and utilizing at least one of the optimum engine rotational speed and the optimum torque to facilitate performing of at least one of disengaging the internal combustion engine from the drive train and reengaging the internal combustion engine with the drive train.

2. The method according to claim 1, further comprising upon disengaging the internal combustion engine from the drive train, providing at least one of a rotational speed and torque to the transmission from the second drive unit.

3. The method according to claim 1, further comprising calculating at least one of a minimum engine rotational speed and a minimum torque, which in each case represent a lower threshold value for the heating-up of the exhaust gas emission control assembly.

4. The method according to claim 1, further comprising calculating at least one of a maximum engine rotational speed and a minimum engine rotational speed, which in each case represent an upper threshold value for the heating-up of the exhaust gas emission control assembly.

5. The method according to claim 1, further comprising assigning priority for at least one of an optimum engine rotational speed, a minimum engine rotational speed, and a maximum engine rotational speed.

6. The method according to claim 1, further comprising assigning a priority for at least one of an optimum torque, a minimum torque and a maximum torque.

7. The method according to claim 1, further comprising allowing demands from varying functional units different from the exhaust gas emission control assembly in a motor vehicle control system with regard to engine rotational speed and assigning, in each case, a priority to the demands of the varying functional units.

8. The method according to claim 7, wherein the demands, which do not themselves originate with the heating-up or keeping warm of the exhaust gas emission control assembly, are only then taken into account, if at least one of the following occurs, their priority is higher, an engine rotational speed demanded, a torque demanded lies above a minimum engine rotational speed and a torque demanded lies beneath a maximum engine rotational speed.

9. The method according to claim 7, wherein the demands, which do not themselves originate from the at least one of the heating-up and the keeping warm of the exhaust gas emission control assembly, are only then taken into account, if at least one of the following occurs, their priority is higher, a torque demanded lies above a minimum torque and a torque demanded lies beneath a maximum torque.

10. The method according to claim 1, wherein setting includes setting the engine rotational speed such that an open loop control of an automatic transmission is adapted to selection of a gear ratio in such a manner that at least one of the following occurs, a rotational speed lying as close as possible to an optimum engine rotational speed results, a minimum engine rotational speed is not undershot and that a maximum engine rotational speed is not exceeded.

11. The method according to claim 1, wherein at least one of optimum engine rotational speed, minimum engine rotational speed, maximum engine rotational speed, optimum torque, minimum torque, and maximum torque are variably dependent on at least one of ambient conditions and an already implemented heating progression of the exhaust gas emission control assembly.

12. A motor vehicle with, a controller, an exhaust gas emission control assembly and a drive train in which the internal combustion engine and at least one second drive unit are connected, whereby the drive train has a transmission, wherein the controller causes the internal combustion engine to be disengaged from the drive train in response to at least one of a torque of the drive train and an engine rotational speed that facilitates heating-up and keeping warm of the exhaust gas emission control, whereby in a drive operating state, which lies outside of an idling operational state in which the internal combustion engine operates at an idling speed, at least one of a rotational speed and a torque of the internal combustion engine is adjustable, wherein the controller facilitates deviation of at least one of the engine rotational speed and torque of the internal combustion engine operating in the drive operational state from default values which facilitate operation of the internal combustion engine without performing at least one of heating-up and keeping warm of the exhaust gas emission control assembly, and wherein the controller calculates at least one of an optimum engine rotational speed and an optimum torque required for performing at least one of heating-up and keeping warm of the exhaust gas emission control assembly.

13. The motor vehicle according to claim 12, wherein a second drive unit is an electric machine.

14. The motor vehicle according to claim 12, wherein the internal combustion engine is be disengaged from the drive train by a decoupler.

* * * * *